(12) United States Patent
Aksit et al.

(10) Patent No.: US 6,340,286 B1
(45) Date of Patent: Jan. 22, 2002

(54) ROTARY MACHINE HAVING A SEAL ASSEMBLY

(75) Inventors: Mahmut Faruk Aksit, Troy; Raymond Edward Chupp, Glenville; Osman Saim Dinc, Troy, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/472,916

(22) Filed: Dec. 27, 1999

(51) Int. Cl.[7] ............................................... F01D 11/08
(52) U.S. Cl. ................. 415/173.3; 415/173.4; 415/174.2; 415/174.4
(58) Field of Search .................. 415/173.4, 174.4, 415/173.3, 174.2, 196, 197

(56) References Cited

U.S. PATENT DOCUMENTS

| | | | | |
|---|---|---|---|---|
| 3,843,278 A | * | 10/1974 | Torell | 415/174.4 |
| 4,430,360 A | * | 2/1984 | Bill et al. | 427/34 |
| 5,145,316 A | * | 9/1992 | Birch | 415/173.1 |
| 5,192,185 A | * | 3/1993 | Leonard | 415/170.1 |
| 5,228,828 A | | 7/1993 | Damlis et al. | 415/173.2 |
| 5,267,828 A | * | 12/1993 | Lenhart et al. | 415/9 |
| 5,344,284 A | * | 9/1994 | Delvaux et al. | 415/173.2 |
| 5,657,998 A | | 8/1997 | Dinc et al. | 277/230 |
| 6,113,349 A | * | 9/2000 | Bagepalli et al. | 415/135 |

FOREIGN PATENT DOCUMENTS

GB    1191477    * 5/1970

* cited by examiner

Primary Examiner—Edward K. Look
Assistant Examiner—Ninh Nguyen

(57) ABSTRACT

A rotary machine includes a rotatable rotor, blades radially mounted on and spaced apart about the rotor, a stationary casing disposed about and radially outward from the rotor and blades defining an annular gap between the casing and tips of the blades, and a flexible abradable seal assembly attached on the casing and disposed within the annular gap such that during differential growth of the rotor and blades relative to the casing the seal assembly flexes and abrades in response to contact by the blade tips and thereby clearance between the casing and blade tips is controlled as to avoid contact by the moving blade tips with the casing.

28 Claims, 3 Drawing Sheets

ROTARY MACHINE HAVING A SEAL ASSEMBLY

BACKGROUND OF THE INVENTION

The present invention generally relates to rotary machines, such as steam and gas turbines, and, more particularly, is concerned with a rotary machine having a seal assembly for controlling clearance between tips of rotating rotor blades and a stationary outer casing of the rotary machine.

Steam and gas turbines are used, among other purposes, to power electric generators, and gas turbines also are used, among other purposes, to propel aircraft and ships. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Compressor and turbine sections include at least one circumferential row of rotating blades. The free ends or tips of the rotating blades are surrounded by a stator casing.

The efficiency of the turbine depends in part on the radial clearance or gap between the rotor blade tips and the surrounding casing. If the clearance is too large, more of the steam or gas flow will leak through the gap between the rotor blade tips and the surrounding casing, decreasing the turbine's efficiency. If the clearance is too small, the rotor blade tips may strike the surrounding casing during certain turbine operating conditions.

It is known that the clearance changes during periods of acceleration or deceleration due to changing centrifugal force on the blade tips and due to relative thermal growth between the rotating rotor and stationary casing. During periods of differential centrifugal and thermal growth of the rotor and casing the clearance changes can result in severe rubbing of the moving blade tips against the stationary casing. This increase in blade tip clearance results in efficiency loss.

Clearance control devices, such as rigid abradable shrouds, have been proposed in the past to accommodate rotor-to-casing clearance change. However, none are believed to represent an optimum design for controlling such clearance. Consequently, a need still remains for an innovation which will provide a solution to the above-described clearance control problem without introducing any new problems in place thereof.

BRIEF SUMMARY OF THE INVENTION

The present invention provides a rotary machine with a flexible abradable seal assembly designed to satisfy the aforementioned need. The flexible abradable seal assembly controls the radial clearance between the rotating rotor blades and the stationary outer casing of the rotary machine by flexing and abrading in response to contact therewith by the blade tips due to differential growth of the rotor and blades relative to the casing and thereby reduces contact severity by moving abradable layer with blade. Compared to commonly used rigid abradable shrouds, the flexibility of the seal assembly of the present invention will result in less heat generation and material removal. The reduced wear rates of the seal assembly will provide tighter blade tip clearances for longer periods yielding better operating efficiency.

In an embodiment of the present invention, a rotary machine is provided which includes a rotor rotatable about a longitudinal axis and having an outer surface, a plurality of blades mounted on and spaced from one another circumferentially about and extending radially outward relative to the longitudinal axis and from the outer surface of the rotor to end tips of the blades, an outer casing having an annular shape and an inner circumferential surface and being stationarily disposed about and spaced radially outwardly from the rotor and the blades so as to define an annular gap between the inner circumferential surface of the outer casing and the end tips of the blades, and a flexible abradable seal assembly attached on the inner circumferential surface of the outer casing and disposed within the annular clearance gap between the casing and blade tips such that, during periods of differential growth of the rotor and blades relative to the casing, the seal assembly flexes and abrades in response to contact therewith by the tips of the blades moving with the rotor and thereby clearance between the casing and rotor blades at the annular gap being controlled in such manner as to avoid contact by the moving blade tips with the casing.

Different embodiments of the flexible abradable seal assembly are disclosed. In each embodiment the seal assembly basically includes an elongated flexible body having an arcuate shape generally conforming to the annular shape of the inner circumferential surface of the outer casing, a pair of opposite spaced apart longitudinally extending edge portions spaced respectively upstream and downstream of the end tips of the rotor blades, and a main body portion extending between and interconnecting the opposite edge portions and being disposed outwardly of and aligned with the end tips of the rotor blades. The elongated flexible body has a portion disposed adjacent to the end tips of the rotor blades that is a material abradable in response to contact therewith by the end tips of the rotor blades. In the illustrations, the flexible body is made up of an annular array of a plurality of like arcuate-shaped body segments disposed end-to-end with one another.

In each embodiment the seal assembly further basically includes means for securing the flexible body at the opposite edge portions thereof to the inner circumferential surface of the outer casing. As examples, the securing means can be welds or fasteners.

DETAILED DESCRIPTION OF THE INVENTION

The present invention is a rotary machine. Rotary machines include, without limitation, centrifugal compressors, generators, and turbines. Turbines include, without limitation, steam turbines and gas turbines. Turbines have, without limitation, compressor sections and turbine sections. Although the invention is hereinafter described in terms of a turbine, it is understood that the invention is not so limited and applies to any rotary machine as will be appreciated by those skilled in the art. It is noted that FIG. 1 shows only a portion of a rotary machine, such portion including, among other elements, a housing and a rotor of a turbine.

Figure 1:
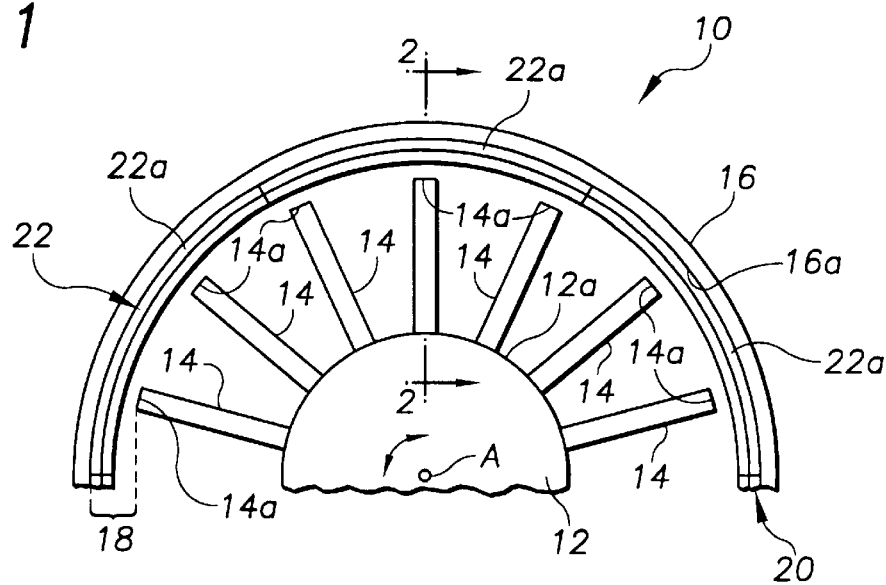
FIG. 1 is a fragmentary end elevational diagrammatic view of a turbine embodiment of the rotary machine of the present invention having a flexible abradable seal assembly attached on an inner circumference of a casing of the turbine and disposed in an annular gap between the outer casing and moving tips of blades mounted on and rotating with a rotor of the turbine.
Figure 2:
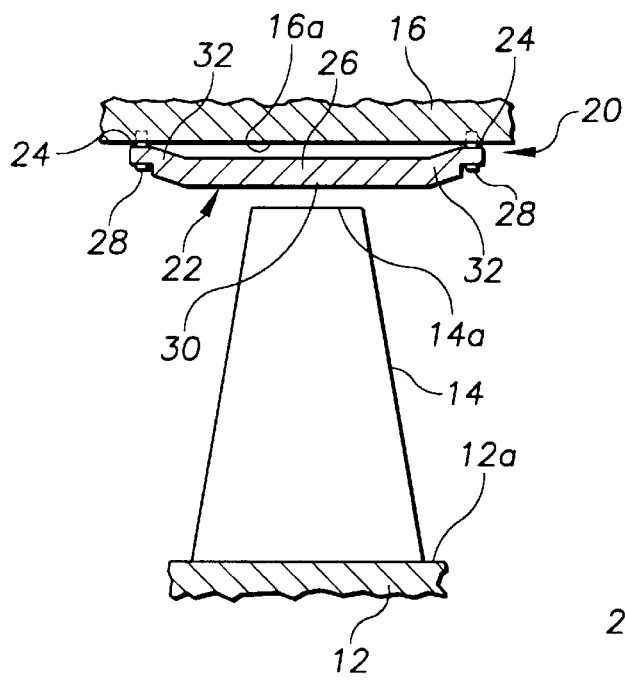
FIG. 2 is an enlarged fragmentary elevational view taken along line 2—2 of FIG. 1 showing in a cross-section thereof a first embodiment of the seal assembly.
Figure 3:
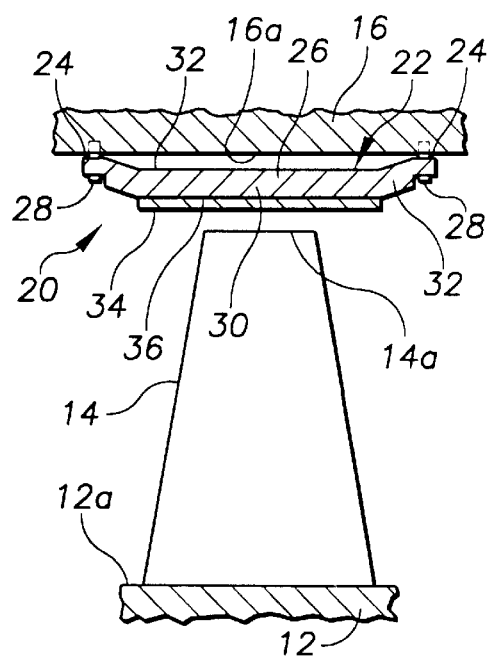
FIG. 3 is a view similar to that of FIG. 2 but showing in a cross-section thereof a second embodiment of the seal assembly.
Figure 4:
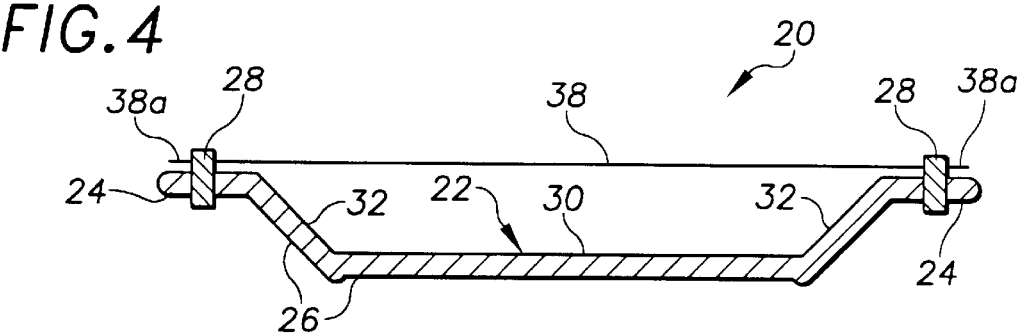
FIG. 4 is a cross-sectional view of a third embodiment of the seal assembly.
Figure 5:
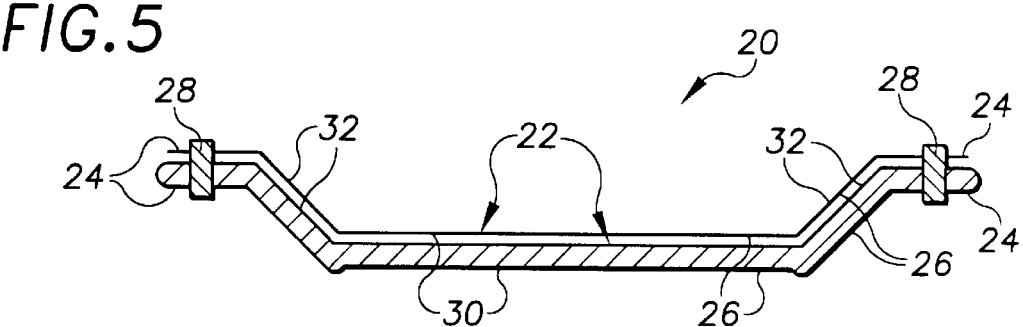
FIG. 5 is a cross-sectional view of a fourth embodiment of the seal assembly.
Figure 6:
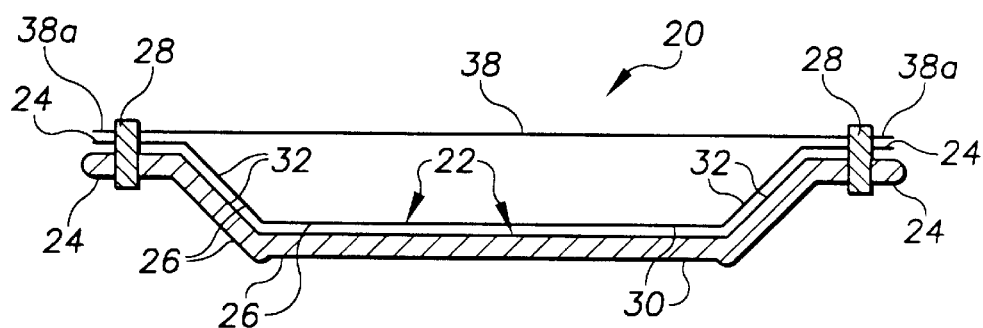
FIG. 6 is a cross-sectional view of a fifth embodiment of the seal assembly.
Figure 7:
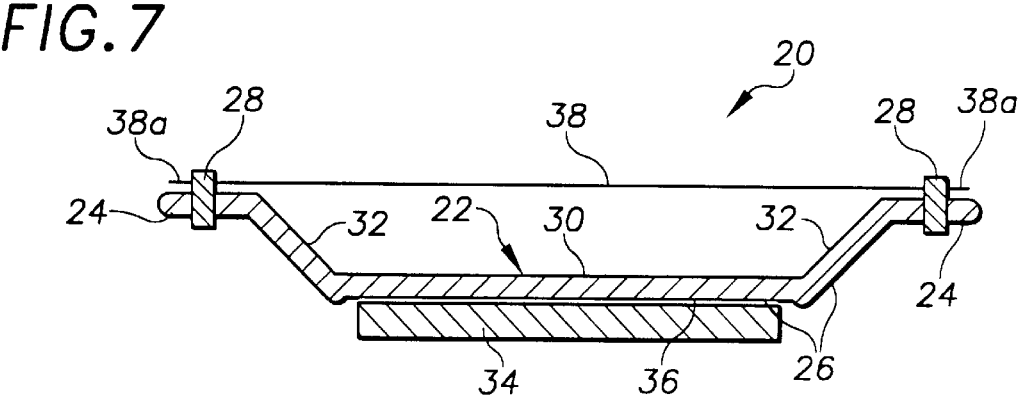
FIG. 7 is a cross-sectional view of a sixth embodiment of the seal assembly.
Figure 8:
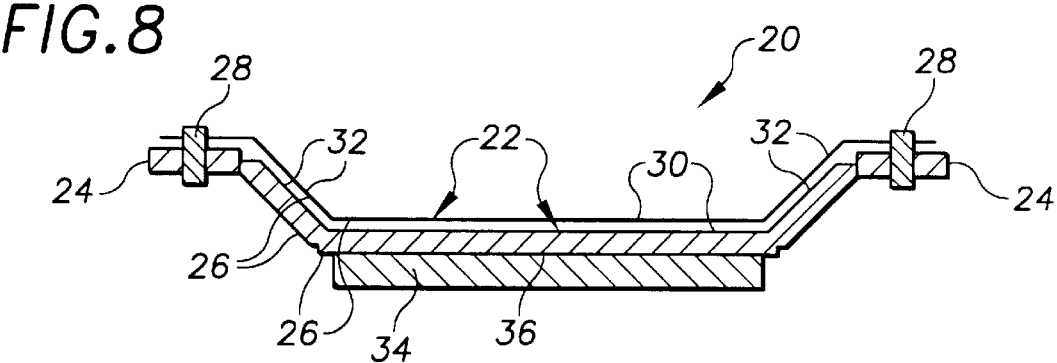
FIG. 8 is a cross-sectional view of a seventh embodiment of the seal assembly.
Figure 9:
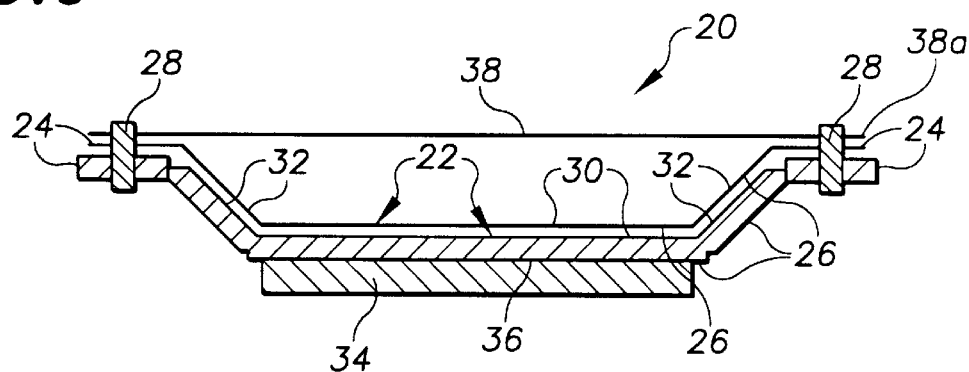
FIG. 9 is a cross-sectional view of an eighth embodiment of the seal assembly.
Figure 10:
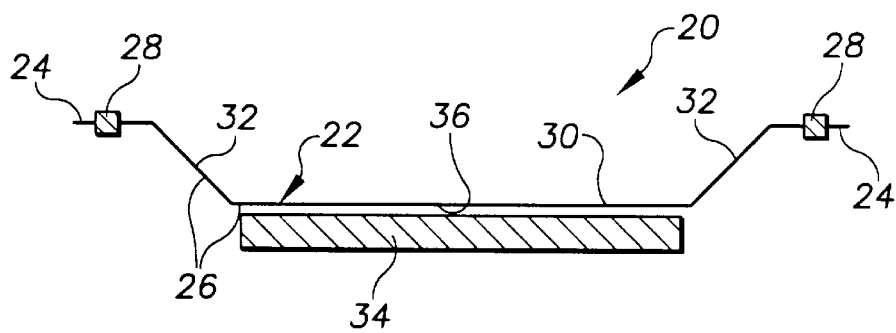
FIG. 10 is a cross-sectional view of a ninth embodiment of the seal assembly.
Figure 11:
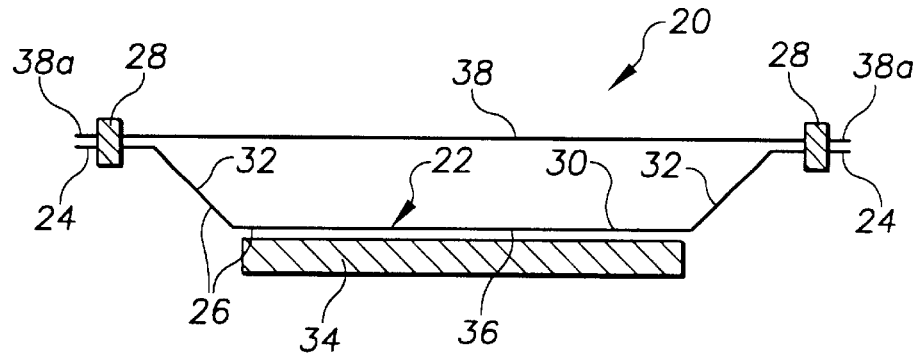
FIG. 11 is a cross-sectional view of a tenth embodiment of the seal assembly.

Referring now to the drawings and particularly to FIG. 1, there is illustrated in a diagrammatical form a turbine, generally designated 10, of the present invention having a rotor 12 rotatable about a central longitudinal axis A and having an outer annular surface 12a, a plurality of blades 14 fixedly mounted on, spaced from one another circumferentially about, and extending radially outward from the outer annular surface 12a of the rotor 12 to end tips 14a of the blades 14, and an outer casing 16 having a generally annular and cylindrical shape and an inner circumferential surface 16a and being stationarily disposed about and spaced radially outwardly from the rotor 12 and blades 14 so as to define an annular gap 18 between the inner circumferential surface 16a of the outer casing and the end tips 14a of the rotor blades 14. A flexible abradable seal assembly 20 is attached on the inner circumference 16a of the outer casing 16 and disposed within the annular gap 18 defined between the inner circumference 16a of the casing 16 and the end tips 14a of the blades 14 rotating with the rotor 12. During periods of differential growth of the rotor 12 and blades 14 relative to the casing 16, the seal assembly 18 flexes and abrades in response to contact therewith by the moving blade tips 14a. In such manner, contact by the moving blade tips 14a with the stationary casing 16 is avoided and the clearance between the stationary casing 16 and the moving rotor blades 14 is thereby controlled by the seal assembly 18 of the present invention.

The flexible abradable seal assembly 20 can be provided in different modified forms or embodiments as shown in FIGS. 2 to 11. In each modified form or embodiment, the seal assembly 20 basically includes an elongated flexible body 22 having an arcuate shape generally conforming to the annular shape of the inner circumferential surface 16a of the outer casing 16. The flexible body 22 also has a pair of opposite spaced apart longitudinally extending edge portions 24 spaced respectively upstream and downstream of the end tips 14a of the rotor blades 14 and a main body portion 26 extending between and interconnecting the opposite edge portions 24 and being disposed outwardly of and aligned with the end tips 14a of the rotor blades 14. The elongated flexible body 22 of each of the embodiments of FIGS. 2 to 11 has at least a portion disposed adjacent to the end tips 14a of the rotor blades 14 that is a material abradable in response to contact therewith by the end tips 14a of the rotor blades 14. As can be seen in FIG. 1, the flexible body 22 is made up of an annular array of a plurality of like arcuate-shaped body segments 22a disposed end-to-end with one another.

In each embodiment, the seal assembly 20 further basically includes means 28 for securing the flexible body 22 at the opposite edge portions 24 thereof to the inner circumferential surface 16a of the outer casing 14. By ways of examples, and not limitations, the securing means 28 can be a plurality of spot welds or fasteners. Additionally, the securing means can include a groove in the casing 16 which receives the opposite edge portions 24 of the flexible body 22. The seal assembly 20 can be entrenched in the casing 16 so as to reduce its aerodynamic resistance.

More particularly, the main body portion 26 of the flexible body 22 of each of the embodiments of the seal assembly 20 has a central section 30 overlying the end tips 14a of the rotor blades 14 and means for interconnecting the opposite edge portions 24 of the flexible body 22 and the central section 30 of the main body portion 26 thereof such that the central section 30 is spaced sufficiently inwardly from the inner circumferential surface 16a of the outer casing 16 to allow flexing of the main body portion away from the rotor blades 14 and toward the outer casing 16 in response to contact by the moving end tips 14a of the rotor blades 14. The central section 30 of the main body portion 26 of the flexible body 22 is generally flat in an unflexed state. The means for interconnecting the opposite edge portions 24 of the flexible body 22 and the central section 30 of the main body portion 26 is a pair of opposite side sections 32 disposed between and attached respectively to the opposite edge portions 24 of the flexible body 22 and to opposite edges 30a of the central section 30 of the main body portion 26. The opposite side sections 32 of the main body portion 26 of the flexible body 22 extend in oppositely inclined relationships from the central section 30 of the main body portion 26 so as to dispose the central section 30 of the main body portion 26 in the desired inwardly spaced position from the outer casing 16.

As seen in FIGS. 2 and 4 to 6, the flexible body 22 itself can be made of the abradable material. As examples, the abradable material can be a ceramic or a suitable metal. Furthermore, by way of examples, the flexible body 22 can be in a woven cloth form or in a sheet form. Additionally, the flexible body 22 can be only one layer of material, as seen in FIGS. 2 to 4, 10 and 11 or can be a plurality of layers of material, as seen in FIGS. 5 to 9. When the flexible body 22 is a plurality of layers, they can be sliced and staggered to reduce stiffness and leakage.

Further, where the abradable material is separate from that of the flexible body 22, it is in the form of a layer of coating 34 applied on an inner surface 36 of the central section 30 of the main body portion 26 of the flexible body 22 which faces toward the end tips 14a of the rotor blades 14, as seen in FIGS. 3 and 7 to 11. The use of an abradable coating 34 mounted on the flexible body 22 also solves the erosion life problem. The ability to change hardness of the coating 34 and stiffness of the seal independently, allows the abradable coating 34 to be hard enough to provide sufficient erosion life without actually doing any extensive damage to the blades 14 through the reduction in seal stiffness. Decoupling the seal stiffness and the coating hardness also increases the number of coating choices that can be applied to any particular application.

If the flexible body 22 has a high porosity, as seen in FIGS. 4, 6, 7, 9 and 11 the seal assembly 20 can also use a flexible backing sheet 38, such as an inner liner of sheet metal, with the flexible body 22 to eliminate leakage. The flexible backing sheet 38 is fastened along its opposite edges 38a to the casing 16 by the securing means 28. The flexible backing sheet 38 has a generally planar configuration and is spaced from the central section 30 of the main body portion 26 of the flexible body 22.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. A rotary machine, comprising:

a rotor rotatable about a longitudinal axis and having an outer annular surface;

a plurality of blades mounted on and spaced apart from one another circumferentially about said outer annular surface of said rotor and extending radially outward relative to said longitudinal axis and from said outer annular surface of said rotor to end tips of said blades;

an outer casing having an annular shape and an inner circumferential surface and being stationarily disposed about and spaced radially outwardly from said rotor and said blades thereon so as to define an annular gap between said inner circumferential surface of said casing and said end tips of said blades;

a flexible abradable seal assembly attached on said inner circumferential surface of said casing and disposed within said annular gap between said casing and blade tips such that, during periods of differential growth of said rotor and blades relative to said casing, said flexible abradable seal assembly flexes and abrades in response to contact therewith by said tips of said blades moving with said rotor and thereby clearance between said casing and said rotor blades at said gap is controlled in such manner as to avoid contact by said moving blade tips with said casing;

wherein said flexible abradable seal assembly includes an elongated flexible body having an arcuate shape generally conforming to said annular shape of said inner circumferential surface of said casing, a pair of opposite spaced apart longitudinally extending edge portions spaced respectively upstream and downstream of said end tips of said rotor blades, and a main body portion extending between and interconnecting said opposite edge portions and being disposed outwardly of and aligned with said end tips of said rotor blades, said elongated flexible body having a portion disposed adjacent to said end tips of said rotor blades and being of an abradable material in response to contact therewith by said end tips of said rotor blades; and wherein said flexible body itself is made of said abradable material;

a securing mechanism for securing said flexible body at said opposite edge portions thereof to said inner circumferential surface of said outer casing.

2. The rotary machine of claim 1 in which said flexible body is an annular array of a plurality of like arcuate-shaped body segments disposed end-to-end with one another.

3. The rotary machine of claim 1 in which said main body portion of said flexible body has a central section overlying said end tips of said rotor blades and means for interconnecting said opposite edge portions of said flexible body and said central section of said main body portion such that said central section of said main body portion is spaced sufficiently inwardly from said inner circumferential surface of said outer casing to allow flexing of said main body portion toward said outer casing in response to contact by said end tips of said rotor blades.

4. The rotary machine of claim 3 in which said central section of said main body portion of said flexible body has generally flat in an unflexed state.

5. The rotary machine of claim 3 in which said abradable material of said portion of said flexible body is in a form of a layer of coating applied on an inner surface of said central section of said main body portion of said flexible body facing toward said end tips of said rotor blades.

6. The rotary machine of claim 3 in which said means for interconnecting said opposite edge portions of said flexible body and said central section of said main body portion is a pair of opposite side sections disposed between and attached respectively to said opposite edge portions of said flexible body and to opposite edges of said central section of said main body portion.

7. The rotary machine of claim 6 in which said opposite side sections of said main body portion of said flexible body extend in oppositely inclined relationships from said central section of said main body portion so as to dispose said central section of said main body portion in said inwardly spaced position from said outer casing.

8. The rotary machine of claim 1 in which said securing mechanism for securing said flexible body at said opposite edge portions thereof to said inner circumferential surface of said outer casing is a plurality of fasteners.

9. The rotary machine of claim 1 in which said abradable material is a ceramic.

10. The rotary machine of claim 1 in which said abradable material is a metal.

11. The rotary machine of claim 1 in which said abradable portion is in a sheet form.

12. The rotary machine of claim 1 in which said abradable portion is at least one layer of material.

13. The rotary machine of claim 1 in which said abradable portion is a plurality of layers of material.

14. A rotary machine, comprising:

a rotor rotatable about a longitudinal axis and having an outer annular surface;

a plurality of blades mounted on and spaced apart from one another circumferentially about said outer annular surface of said rotor and extending radially outward relative to said longitudinal axis and from said outer annular surface of said rotor to end tips of said blades;

an outer casing having an annular shape and an inner circumferential surface and being stationarily disposed about and spaced radially outwardly from said rotor and said blades thereon so as to define an annular gap between said inner circumferential surface of said casing and said end tips of said blades;

a flexible abradable seal assembly attached on said inner circumferential surface of said casing and disposed within said annular gap between said casing and blade tips such that, during periods of differential growth of said rotor and blades relative to said casing, said flexible abradable seal assembly flexes and abrades in response to contact therewith by said tips of said blades moving with said rotor and thereby clearance between said casing and said rotor blades at said gap is controlled in such manner as to avoid contact by said moving blade tips with said casing;

wherein said flexible abradable seal assembly includes an elongated flexible body having an arcuate shape generally conforming to said annular shape of said inner circumferential surface of said casing, a pair of opposite spaced apart longitudinally extending edge portions spaced respectively upstream and downstream of said end tips of said rotor blades, and a main body portion extending between and interconnecting said opposite edge portions and being disposed outwardly of and aligned with said end tips of said rotor blades, said elongated flexible body having a portion disposed adjacent to said end tips of said rotor blades and being of an abradable material in response to contact therewith by said end tips of said rotor blades; and a securing mechanism for securing said flexible body at said opposite edge portions thereof to said inner circumferential surface of said outer casing wherein said securing mechanism for securing said flexible body at said opposite edge portions thereof to said inner circumferential surface of said outer casing is a plurality of welds.

15. The rotary machine of claim 14 in which said abradable material of said portion of said flexible body is a ceramic.

16. The rotary machine of claim 14 in which said abradable material of said portion of said flexible body is a metal.

17. The rotary machine of claim 14 in which said abradable material of said portion of said flexible body is in a form of a layer of coating on an inner surface of said flexible body facing toward said end tips of said rotor blades.

18. A rotary machine, comprising:

a rotor rotatable about a longitudinal axis and having an outer annular surface;

a plurality of blades mounted on and spaced apart from one another circumferentially about said outer annular surface of said rotor and extending radially outward relative to said longitudinal axis and from said outer annular surface of said rotor to end tips of said blades;

an outer casing having an annular shape and an inner circumferential surface and being stationarily disposed about and spaced radially outwardly from said rotor and said blades thereon so as to define an annular gap between said inner circumferential surface of said casing and said end tips of said blades;

a flexible abradable seal assembly attached on said inner circumferential surface of said casing and disposed within said annular gap between said casing and blade tips such that, during periods of differential growth of said rotor and blades relative to said casing, said flexible abradable seal assembly flexes and abrades in response to contact therewith by said tips of said blades moving with said rotor and thereby clearance between said casing and said rotor blades at said gap is controlled in such manner as to avoid contact by said moving blade tips with said casing;

wherein said flexible abradable seal assembly includes an elongated flexible body having an arcuate shape generally conforming to said annular shape of said inner circumferential surface of said casing, a pair of opposite spaced apart longitudinally extending edge portions spaced respectively upstream and downstream of said end tips of said rotor blades, and a main body portion extending between and interconnecting said opposite edge portions and being disposed outwardly of and aligned with said end tips of said rotor blades, said elongated flexible body having a portion disposed adjacent to said end tips of said rotor blades and being of an abradable material in response to contact therewith by said end tips of said rotor blades; and wherein said flexible body itself is in a woven cloth form;

a securing mechanism for securing said flexible body at said opposite edge portions thereof to said inner circumferential surface of said outer casing.

19. The rotary machine of claim 18 in which said flexible body is an annular array of a plurality of like arcuate-shaped body segments disposed end-to-end with one another.

20. The rotary machine of claim 18 in which said main body portion of said flexible body has a central section overlying said end tips of said rotor blades and means for interconnecting said opposite edge portions of said flexible body and said central section of said main body portion such that said central section of said main body portion is spaced sufficiently inwardly from said inner circumferential surface of said outer casing to allow flexing of said main body portion toward said outer casing in response to contact by said end tips of said rotor blades.

21. The rotary machine of claim 20 in which said central section of said main body portion of said flexible body has generally flat in an unflexed state.

22. The rotary machine of claim 20 in which said abradable material of said portion of said flexible body is in a form of a layer of coating applied on an inner surface of said central section of said main body portion of said flexible body facing toward said end tips of said rotor blades.

23. The rotary machine of claim 20 in which said means for interconnecting said opposite edge portions of said flexible body and said central section of said main body portion is a pair of opposite side sections disposed between and attached respectively to said opposite edge portions of said flexible body and to opposite edges of said central section of said main body portion.

24. The rotary machine of claim 23 in which said opposite side sections of said main body portion of said flexible body extend in oppositely inclined relationships from said central section of said main body portion so as to dispose said central section of said main body portion in said inwardly spaced position from said outer casing.

25. The rotary machine of claim 18 in which said woven cloth form is in a sheet form.

26. The rotary machine of claim 18 in which said woven cloth form comprises least one layer of material.

27. The rotary machine of claim 18 in which said woven cloth form comprises a plurality of layers of material.

28. The rotary machine of claim 18 in which said securing mechanism for securing said flexible body at said opposite edge portions thereof to said inner circumferential surface of said outer casing is a plurality of fasteners.

* * * * *